June 9, 1953 P. W. HOLTHAUS 2,641,114
FUEL GAS TREATMENT
Filed May 6, 1952
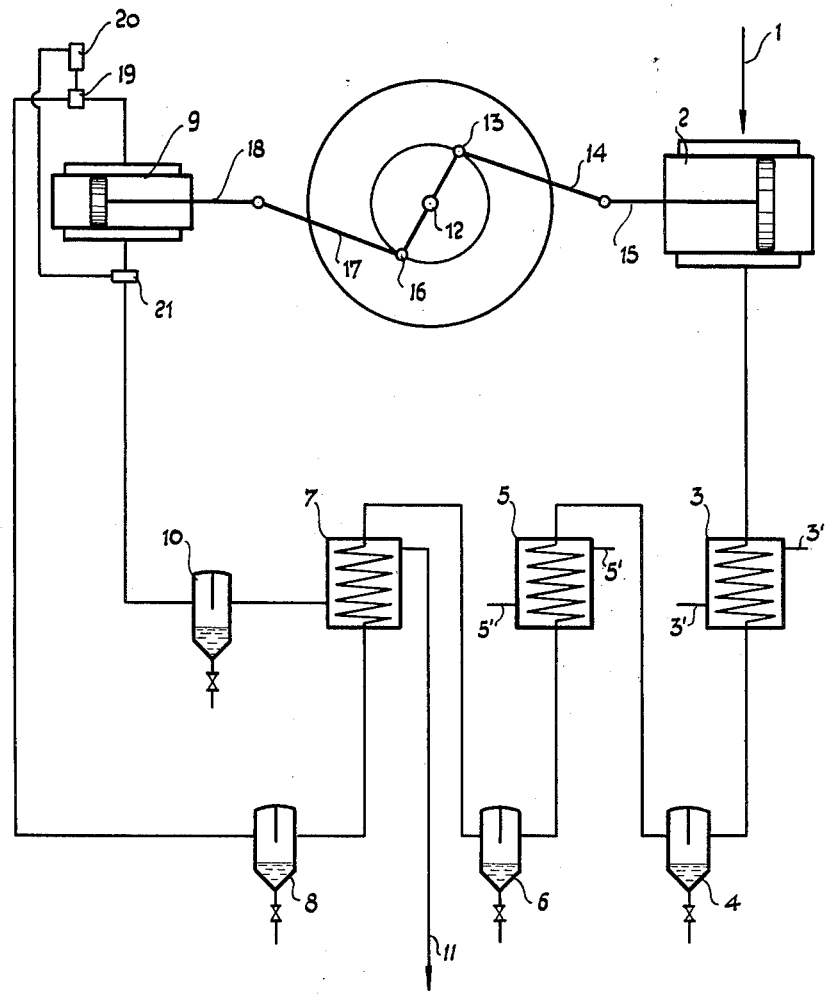
INVENTOR
PAUL WILHELM HOLTHAUS
BY
John E. Hubbell
ATTORNEY

UNITED STATES PATENT OFFICE 2,641,114

FUEL GAS TREATMENT

Paul Wilhelm Holthaus, Heessen, Germany

Application May 6, 1952, Serial No. 286,408
In Germany March 30, 1949

4 Claims. (Cl. 62—175.5)

This invention relates to gas distribution systems.

Fuel gases, which are usually distributed by a main under a raised pressure, contain, when they enter the main, substances, in particular water and naphthalene, in a saturated vapor stage which is produced by the compression of the gas and subsequent indirect cooling by circulating recooled water or by fresh water. During passage of the gas through the main any cooling at constant pressure must cause a lowering of the temperature below the dew point and a consequent condensation and suitable cooling at a reduced pressure may also have this effect. It is true that the water condensate can be removed from time to time from the gas main by means of suitably arranged drain traps but as the water condensate absorbs sulphur and cyanogen compounds, oxygen and carbon dioxide from the gas, solutions are formed which may cause corrosion of the steel pipe-line. The tendency of naphthalene to crystallize out on the coldest parts of the pipe-line leads to narrowing of the cross section of the passage through the pipe and may even result in the pipe becoming completely blocked.

One of the oldest expedients for meeting the difficulties caused by naphthalene is to leave naphthalene solvents in the gas to be distributed or to charge the gas with such solvents and to drain the solvents and the dissolved naphthalene as condensates at places along the pipe-line. This is a somewhat costly process and, owing to the shortage of tar oils and other naphthalene solvents, not to be recommended.

In consequence, a frequently used method is to wash the previously compressed gas with a naphthalene solvent, for instance a tar-oil or a hydrogenated naphthalene in order to remove the naphthalene. However, in this method also some of the washing agent, the proportion depending on the vapor pressure, is carried with the gas into the main. In order to separate the water, the gas has been treated with hygroscopic substances, for instance calcium chloride.

A more economical method in some cases has involved subjecting the already cleaned and compressed gas to a so-called low-cooling process in which the gas is cooled to a temperature slightly above the freezing point of water.

The naphthalene and water are thereby so far separated out that condensation of these substances along the main, which in general is at a higher temperature and lower pressure than the pressure and temperature to which the gas had been before introduction to the main, need no longer be of substantial importance. In order to cool the compressed gases to temperatures of 5° C. and below, refrigerating plants of the compression or absorption types have been used, but these plants are expensive and need special attention besides being uncommon apparatus in a coke oven plant.

After the valuable substances, in particular the tar and benzol, have been extracted from the gas as determined by economic standards, whether under ordinary or raised pressure, it is practically important to separate out of the gas which is to be passed into a distribution main or piping system the comparatively small residue quantities of substances particularly water and naphthalene, which have little or no value but can cause trouble in the distribution main or piping. This separation out cannot be profitable to any real extent and the process is therefore one of purification and the cost of carrying it out is an overhead charge on the cost of the gas conveyed through the main.

The general purpose of the present invention is to provide an improved method of and apparatus for separating the above mentioned residues from fuel gas to be passed into a distribution main or piping system. In the practice of the present invention, a fuel gas is, before admission to a main, compressed to a pressure above the pressure in the main, and the compressed gas is cooled and subsequently expanded until its pressure falls to, or approximately to the gas pressure in the main, and the temperature falls to a value to cause condensable substances, for example water and naphthalene, to be separated out from the gas.

The present invention further consists in a low-cooling process for treating fuel gas which comprises compressing the gas to a pressure above the gas pressure in the main, indirectly cooling the gas and subsequently expanding the gas until the temperature reaches a desired low value and employing the energy liberated by the expansion of the gas to do useful work.

The expansion of the gas, whether adiabatic or polytropic, is carried out until the low temperature is reached at which the desired separation of the undesired substances in the gas are separated out.

The energy of expansion of the gas may be used for generating electric power or for other purposes, and may be particularly usefully employed by directly coupling the expander with the compressor so that the work done by the expander is put into the compressor. In such an arrangement, as the two machines are in synchronism, fluctuations in the gas supply do not necessitate regulation of the expansion which, furthermore, can, to meet variable working conditions, be adjusted by varying the quantities admitted to the expander. This variation can by a further feature of the invention, be effected by means of an automatic regulator which is controlled in accordance with the temperature of the expanded gas.

By effecting heat exchange between the expanded gas and the gas prior to expansion, the additional energy consumption of the compressor which is required to carry out the method of the invention may be considerably reduced.

It is known to clean gas and then extract valuable components thereof from gases held at the pressure of the gas in the main, or somewhat above this pressure, by means of physical solvents for the products to be extracted or by means of substances which react chemically with such components. It has also been recognized that in consequence of the higher density of the gas, the physical and chemical processes can take place more effectively and can be carried out in smaller apparatus. It is also well known that components of a gas can be condensed by expanding the gas. This process has already been tried for the extraction of benzene from fuel gases at atmospheric pressure, the gases being compressed to an absolute pressure of about three to six atmospheres, cooled to atmospheric temperatures and then expanded to atmospheric pressure. This process of extracting benzene proved economically to be much inferior as compared with the customary washing process, not only because the danger of blocking the pipe-line can only be overcome by the use of benzene-solvents, for example toluol, in the cooling stages and by periodically shutting down and thawing out the heat exchanger, but also because as the vapor pressure of benzene is low, very low temperatures and the above mentioned high pressures with a compression rate of four to seven, are required. In consequence of these requirements, the initial and maintenance costs of the plant are high.

It must be borne in mind that the cost of compressing depends on the compression ratio, even with multistages of compression employing the same type of compression, and it is to be noted that in many cases for the present purposes, the increase of pressure required does not amount to half the pressure to be maintained in the gas main. Bearing in mind the energy gained in the expander, when the ratio of the pressure obtained in the compressor to the pressure in the gas main is 1.4 to 1.0 with the gas main pressure in the range ten to twenty atmospheres, the theoretical value of the additional energy required at the compressor is approximately four per cent of the energy needed to compress to the gas main pressure.

The present invention may be carried into effect in a most simple manner by incorporating the expander in the driving mechanism of the compressor, that is by making the expander an additional driving stage. The compressor may be, for example, a two or three stage compressor. In this case no apparatus uncommon to a gas generating station or one requiring special attention is needed in addition to coolers and heat exchangers which are necessary in any case.

The accompanying drawing is a diagram schematically illustrating an arrangement for carrying out the invention, which comprises a combined compressor and expander. Referring to the drawing, the fuel gas is conveyed by a pipe-line 1 on its way to a distant distributing station. A compressor 2, usually a multi-stage compressor which is provided with intermediate cooling stages, compresses gas received from the line 1 and the heat generated in the final compression stage is extracted by a cooler 3 by means of circulating recooled water flowing through piping 3'. After passing the condensate drain 4, cooling with fresh water flowing through piping 5' may take place in cooler 5, a further condensate drain 6 being arranged on the outlet side of cooler 5. In order to provide additional cooling, the gas passes through heat exchanger 7, on the outlet side of which a further condensate drain 8 is provided. The gas then passes to an expander 9 where it is brought to the desired lowest temperature. The expanded gas is freed of condensate by the drain 10 and, in the heat exchanger 7, takes up part of the sensible heat of the gas which has yet to be expanded. After passing through the heat exchanger 7, the gas enters the gas main at 11.

As diagrammatically illustrated, the piston driving means for the compressor 2 comprises a crank shaft 12, which may be rotated by any suitable motor or other available source of energy, and which includes a crank pin 13 connected by a link or driving rod 14 to the piston stem 15 of the compressor 2. The crank shaft 12 has a second crank pin 16 shown as displaced 180° from the crank pin 13. The pin 16 is connected by a link or driving rod 17 to the piston stem 18 of the expander 9. The crank pins 13 and 16 are shown as being similarly displaced from the axis of the crank shaft 12 so that the circumferential lengths of the circular orbits of the two crank pins are similar. However, it is not essential that the two orbits have the same radii. To permit the rate at which gas is passed into the expander 9 to be varied in accordance with variations in the temperature of the gas passing through the expander, the passage of gas to the expander is controlled by a valve 19 adjusted by an element 20 in accordance with changes in the temperature to which a temperature responsive element 21 in the output gas line of the expander 9 is subjected. The device 21 may be a fluid pressure thermometer.

If, for instance, the temperature of the cooled gas at the drain 6 reaches 35° C. only, and the desired lowest temperature of the gas is 5° C., than a temperature fall of 30° C., i. e. approximately ten percent of the absolute initial temperature, must be produced by the low cooling process. Supposing that in the heat exchanger 7 the gas which is to be expanded can be cooled to 20° C. by means of the expanded gas, then an additional cooling to the extent of 15° C., i. e. approximately five percent of the absolute initial temperature, is to take place in the expander. Theoretically, with adiabatic expansion, this entails a pressure ratio of 1.2. If, for example, the pressure in the main is 10 atmospheres, then the gas has to be expanded from a pressure of 12 to 10 atmospheres. In order to compress to 12 instead of 10 atmospheres, the work of the compressor is increased theoretically by nine percent and of this increase approximately seventy-seven percent is regained at the expander so that, to carry out the invention, a total of only two percent above the work necessary to produce the desired gas pressure in the main is required.

One hundred cubic meters of gas entering the main at 10 atmospheres and at 35° C., may contain 3,960 grams of water and 140 grams of naphthalene. By carrying out the low cooling according to the invention, the same quantity of gas may contain only 680 grams of water and 7.4 grams of naphthalene so that approximately eighty-three percent of water and ninety-five percent of naphthalene will have been removed.

Thus with a surprisingly low consumption of energy and without the use of apparatus and working substances which would be uncommon elements at gas generating stations, substances which condense out from the gas are separated therefrom.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent, is:

1. A process of treating fuel gas from which valuable substances, particularly tar and benzol, have been extracted and preparatory to the passage of the gas into distribution piping, removing easily condensable residue substances such as naphthalene and water by compressing and subsequently expanding the gas while doing useful work which consists in raising the pressure of the gas by compressing it to not more than twice the pressure in the gas main, cooling the compressed gas and subsequently expanding the gas until its pressure falls to a value such as to cause the said condensable substances to be separated out from the gas, and passing into said piping the gas from which said condensible substances have been separated.

2. In preparing fuel gas from which valuable substances, and in particular tar and benzol, have been separated, for movement into an elongated gas main, the process which consists in compressing the gas to a pressure higher than the gas pressure in the main, cooling the compressed gas to approximately atmospheric temperature and expanding the gas to approximately the gas main pressure while maintaining the gas at a temperature above the freezing temperature of water, to thereby separate naphthalene and water from the gas and utilizing available energy in the gas in doing useful work.

3. A process as specified in claim 2, in which heat is exchanged between the gas about to be expanded and the gas which has just been expanded.

4. A process as specified in claim 2, in which the rate at which the gas is compressed is increased and decreased in accordance with increases and decreases in the temperature of the expanded gas.

PAUL WILHELM HOLTHAUS.

References Cited in the file of this patent

UNITED STATES PATENTS

| Number | Name | Date |
|---|---|---|
| 575,714 | Heinzerling | Jan. 26, 1897 |
| 946,069 | Reynolds et al. | Jan. 11, 1910 |
| 1,040,886 | Claude | Oct. 8, 1912 |
| 1,320,168 | Paris | Oct. 28, 1919 |
| 2,077,315 | Ewing et al. | Apr. 13, 1932 |